May 17, 1927.
W. C. STARKEY
MULTIPLE SPRING CLUTCH
Filed May 25, 1925
1,629,420
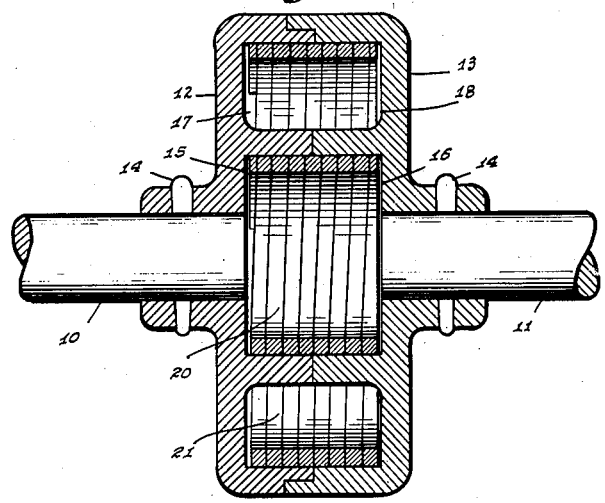
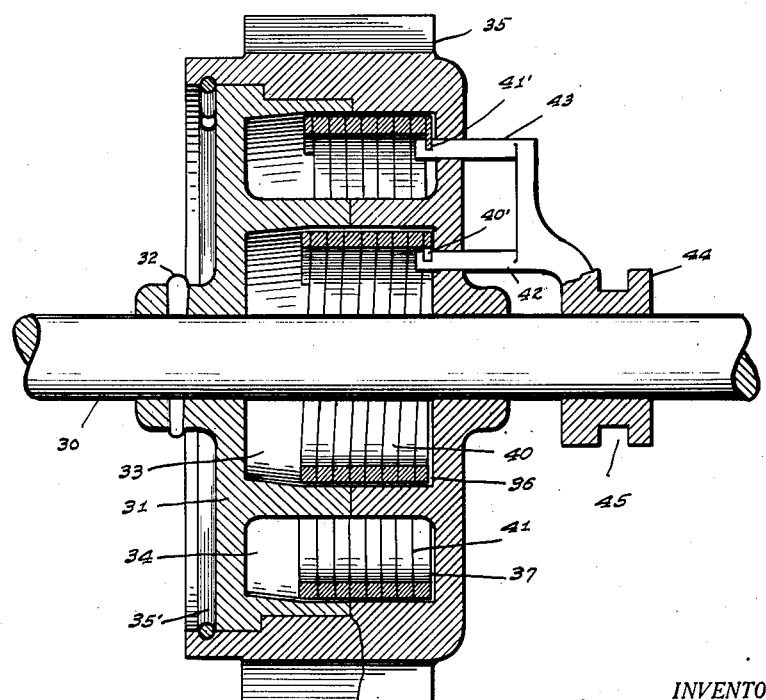
INVENTOR.
William Carleton Starkey,
BY
ATTORNEY.

Patented May 17, 1927.

1,629,420

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

MULTIPLE-SPRING CLUTCH.

Application filed May 25, 1925. Serial No. 32,622.

It is the object of my invention to produce a frictional clutch adapted to occupy but little space and to clutch firmly together two relatively rotatable members. A further object of my invention is to provide in such a clutch for a plurality of clutch units, each of which is adapted to lock the two relatively rotatable members together when they tend to rotate in one direction relatively to each other and to permit free rotation of such elements when they tend to rotate in the opposite direction.

I accomplish the above objects by providing two rotatable members with alined axial recesses, and surrounding such recesses, I provide annular recesses, all concentric with the central recess, and the various recesses in one rotatable part corresponding to those in the other rotatable part, so that the recesses are arranged in concentric pairs with one recess of each pair being in one rotatable part and the other recess in the other part; and in each of such pairs of recesses I provide a helically coiled spring adapted to bear against the walls of the recesses under certain conditions and to clutch the two relatively rotatable parts together.

The accompanying drawings illustrate my invention: Fig. 1 is a longitudinal central section through a clutch adapted to connect the two co-axial shafts, and the springs being adapted to clutch said two shafts together when they tend to rotate relatively in one direction and to permit free relative rotation in the other direction; and Fig. 2 is a longitudinal central section of a clutch adapted to connect a gear with a shaft upon which it is mounted, coiled springs being arranged to be capable of disengagement to permit free relative rotation of gear and shaft in either direction.

In the modification of my invention illustrated in Fig. 1, two co-axial shafts 10 and 11 carry respectively two members 12 and 13, each of which is fixed to its associated shaft as by means of a tapered pin 14. The members 12 and 13 respectively have alined circular recesses 15 and 16 co-axial with each other and with the shafts 10 and 11. Surrounding the recesses 15 and 16 are annular recesses 17 and 18, the recess 17 being located in the member 12 and the recess 18 in the member 13. The diameters of the recesses 15 and 16 are equal as are also the diameters of the recesses 17 and 18.

Located in the recesses 15 and 16 is a helically coiled spring 20, the normal internal diameter of which is slightly greater than the diameter of the recesses 15 and 16, so that when in place in the recesses the coils of the spring engage the walls thereof. A second helically coiled spring 21, similar to the spring 20 but larger in diameter, is located in the recesses 17 and 18 and is slightly larger in diameter than such recesses in order that it may bear against the recess walls.

As illustrated in the drawing, the two springs 20 and 21 are both right-hand springs. It will be obvious that should the shaft 11 tend to rotate relatively to the shaft 10 in a right-hand or clockwise direction the frictional engagement between the springs 20 and 21 and the members 12 and 13 will cause the springs 20 and 21 to tend to unwind and expand in diameter. This tendency to expand forces the springs into firm frictional engagement with the walls of the recesses and thus permits the transmission of the driving torque from the shaft 11 to the shaft 10. Should, however, the shaft 11 rotate in the reverse or counter-clockwise direction relative to the shaft 10, the frictional engagement of the springs with the walls of their associated recesses will cause the springs to wind and contract and to recede from the walls of the recesses thus permitting free relative rotation of the two shafts 10 and 11.

In the device as illustrated in Fig. 2 a shaft 30 carries a member 31 which is fixed to the shaft as by the tapered pin 32. The member 31 is provided with a central recess 33 which is surrounded by an annular recess 34.

Rotatably mounted on the shaft is a gear 35 provided with a central recess 36 and an annular recess 37 corresponding respectively to the recesses 33 and 34 in the member 31. Preferably, the outer recess 37 in the gear 35 is shouldered as at 38 in order that the gear 35 may extend axially over and beyond the external flange of the member 31. A split wire ring 35' received within an annular groove in the projecting wall of the recess 37 and bearing against the member 31 serves to prevent axial separation of the gear from such member. Such a construction is highly desirable for it insures that the end of the outer flange of the member 31 will always be in close proximity to the shoulder in the recess 37 so that the walls of the recesses 34 and 37 will present a continuous surface to be engaged by a coil-spring 41 which is located within such recesses. In the recesses 33 and 36 there is a coil-spring 40 similar to the coil-spring 41. The coil-springs 40 and 41 differ from the springs 20 and 21 shown in Fig. 1 in that the former springs are wound and finished so that their external diameter is, when unstressed, slightly less than the diameters of their corresponding recesses.

The ends 40' and 41' of the coil-springs 40 and 41 are turned radially inward and received respectively in recesses in pins 42 and 43 which pass slidably through holes in the bottoms of the recesses 36 and 37 and are rigidly connected to a member 44 which is slidable axially of the shaft 30. The walls of the recesses 33 and 34 are not cylindrical throughout their entire extent but are tapered inwardly near the bottoms of the recesses to diameters slightly less respectively than the external diameters of the springs 40 and 41 when such springs are free from stresses. With the parts in the position shown, the springs 40 and 41 are withdrawn from the tapered parts of the recesses 33 and 34, are not subjected to any stress, and hence, because of their smaller diameter under such conditions, are out of engagement with the walls of such recesses.

The member 44 may be provided with an annular groove 45 for the reception of any convenient well-known shifting mechanism to be used in moving the member 44 axially of the shaft 30. If the member 44 is moved to the left from the position shown in Fig. 2, the springs 40 and 41 will be moved into the tapered portions of the recesses 33 and 34 and will engage the tapered portion of the walls of such recesses.

As shown in Fig. 2, the two springs 40 and 41 are wound in opposite directions, and hence are adapted to transmit from the gear to the shaft torques which are in opposite directions. Thus, with the springs wound as shown, and moved to the left to engage the tapered portions of the walls 33 and 34, the shaft 30 will be clutched to the gear 35 for rotation in either direction; for when relative rotation in one direction tends to occur, one of the springs 40 or 41 tends to unwind and expand into firm engagement with the walls of its associated recesses to lock the parts together, and should relative rotation of the shaft 30 and gear 35 in the other direction tend to occur, the other spring will expand into firm contact with the walls of its associated recesses. Thus with the springs 40 and 41 in their left-hand position, the gear will be locked to the shaft no matter in which direction these two parts tend to rotate relatively to each other; while movement of the member 44 to the right will disengage the springs and permit free relative movement of gear and shaft in either direction.

My invention is capable of being adapted to many different situations to accomplish different results. Using the two springs illustrated in Fig. 1 with both springs wound in the same direction, I obtain a clutch which is capable of transmitting greater torque than could be transmitted by a clutch using either spring alone. By using springs wound in opposite directions, the two shafts 10 and 11 can be firmly clutched together irrespective of the direction in which they tend to rotate relatively to each other. Each of the coil springs has a maximum torque which it can transmit in the direction tending to unwind such spring. If this torque is exceeded, the spring slips on the surface of its associated recesses. The heavier the spring and the greater its area of contact with the recess walls, the greater will be the torque which it can transmit without slipping. It will therefore be evident that either or both of the two springs can be designed so as to slip when subjected to a torque greater than any predetermined amount. Thus, the device shown in Fig. 2, in which the springs are wound in opposite directions, can be provided with springs capable of transmitting a torque of any desired amount in either direction and to slip when this torque is exceeded.

In the device illustrated in Fig. 2 I have shown both springs provided with means for effecting their disengagement, but it is not necessary to my broad invention that both of the springs be so arranged. Further, it is not necessary that the two springs shown in Fig. 2 be arranged to be controlled by the same disengaging means.

I claim as my invention:

1. In combination, two relatively rotatable members, said members being provided with alined central recesses and with alined annular recesses, coil springs in said recesses adapted to engage the walls thereof so that when said two members tend to rotate relatively in a direction to unwind one of said springs such spring will expand and firmly grip the walls of its associated recesses, said springs being rotatable with one of said members, and means for disengaging said springs from the other of said members.

2. In combination, two relatively rotatable members, said members being provided with alined central recesses and with alined annular recesses, coil springs in said recesses adapted to engage the walls thereof so that when said two members tend to rotate relatively in a direction to unwind one of said springs such spring will expand and firmly grip the walls of its associated recesses, one of said springs being rotatable with one of said members, and means for disengaging such spring from the other of said members.

3. The combination set forth in claim 1 with the addition that two of said springs are wound oppositely.

4. The combination set forth in claim 2 with the addition that two of said springs are wound oppositely.

5. In combination, two relatively rotatable members, said members being provided with alined central recesses and with alined annular recesses, and two coil springs in said circular recesses and in said annular recesses respectively and adapted to engage the walls thereof so that when said two members tend to rotate relatively in a direction to unwind one of said springs such spring will expand and firmly grip the walls of its associated recesses.

6. The combination set forth in claim 5 with the addition that two of said springs are wound oppositely.

7. In combination, two relatively rotatable members, one of said members being provided with a central recess and one or more annular recesses, coil springs operatively engaging the other of said members and extending into said recesses and adapted to engage the walls thereof so that when said two members tend to rotate relatively to each other in a direction to unwind one of said springs such spring will expand and firmly grip the walls of its associated recess, and means for disengaging said springs from one of said members.

8. In combination, two relatively rotatable members, one of said members being provided with a central recess and one or more annular recesses, coil springs operatively engaging the other of said members and extending into said recesses and adapted to engage the walls thereof so that when said two members tend to rotate relatively to each other in a direction to unwind one of said springs such spring will expand and firmly grip the walls of its associated recess, and means for disengaging one of said springs from one of said members.

9. In combination, two relatively rotatable members, one of said members being provided with a central recess and one or more annular recesses, and coil springs operatively engaging the other of said members and extending into said recesses and adapted to engage the walls thereof so that when said two members tend to rotate relatively to each other in a direction to unwind one of said springs such spring will expand and firmly grip the walls of its associated recess.

10. The combination set forth in claim 7 with the addition that two of said springs are wound oppositely.

11. The combination set forth in claim 8 with the addition that two of said springs are wound oppositely.

12. The combination set forth in claim 9 with the addition that two of said springs are wound oppositely.

In witness whereof, I have hereunto set my hand at Indianapolis, Indiana, this 14th day of May, A. D. one thousand nine hundred and twenty five.

WILLIAM CARLETON STARKEY.